Sept. 19, 1950 C. W. HANSELL 2,522,871

MERCURY ARC OSCILLATOR CIRCUITS

Filed March 9, 1945

INVENTOR.
CLARENCE W. HANSELL
BY
H. S. Grover
ATTORNEY

Patented Sept. 19, 1950 2,522,871

UNITED STATES PATENT OFFICE 2,522,871

MERCURY ARC OSCILLATOR CIRCUITS

Clarence W. Hansell, Port Jefferson, N. Y., assignor to Radio Corporation of America, a corporation of Delaware Application March 9, 1945, Serial No. 581,871

16 Claims. (Cl. 250—36)

The present invention relates to high power, high frequency oscillator circuits and, more particularly, to such circuits which are adapted to be used with a gas discharge tube of the mercury arc type.

In my prior United States Patent 2,184,740, granted December 26, 1939, I described a form of electrical oscillator which functioned due to instability of a current limited electrical discharge through a hole in a barrier in a low pressure mercury vapor. With the oscillator described in that patent, it has been possible to convert large amounts of direct current power into appropriate alternating current power at high efficiency.

The present invention is directed toward improving the efficiency of the above-mentioned oscillator when operated with a load having a considerable inductance. Due to the fact that the tube mentioned in the above patent periodically interrupts the anode current with a trasition from maximum to secondary current so rapid that extreme high momentary potentials tend to be developed across the tube and the circuits connected with it, it was found that the circuit operated more efficiently with a resistive load. It is not, in all cases, possible to use a pure resistive load and an object, therefore, of the present invention is the provision of an improved circuit which will enable the efficient operation of the tube with an inductive load.

A further object of the present invention is to provide a circuit which acts effectively as a resistance loading for the tube over a wide range of fundamental oscillation frequencies and for harmonic frequency currents.

A further object of the present invention is the provision of a high efficiency mercury arc oscillator in which the circuit constants determine the operating frequency rather than the geometric dimensions of the tube itself.

The foregoing objects and others which may appear from the following detailed description are attained in one aspect of the invention by providing a voltage suppressing condenser between the anode and cathode which prevents the high peak voltages in the same may as a condenser across relay contacts prevents relay sparking. Furthermore, an inductance is provided between the perforated barrier anode and the cathode to discharge the charge stored in the condenser. The use of an inductance rather than a resistance is preferable because practically none of the energy is absorbed therein but instead is returned to the work circuit.

In another aspect of the invention, the load circuit utilizes a tapered artificial line or network of reactances to present a substantially equal impedance to fundamental and harmonic frequency currents over a wide range of frequencies whereby the network appears to the oscillator more like a simple resistance load.

Figure 1:
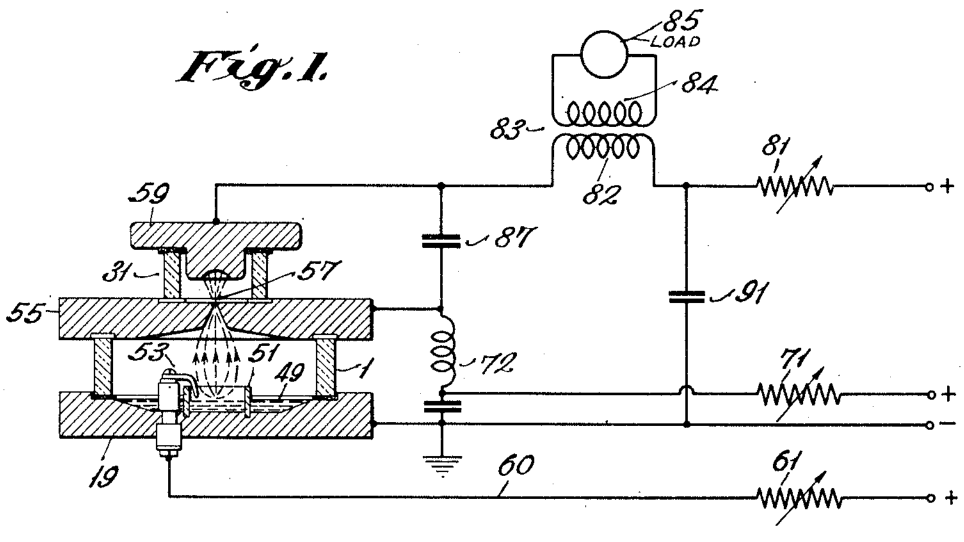
Figure 2:
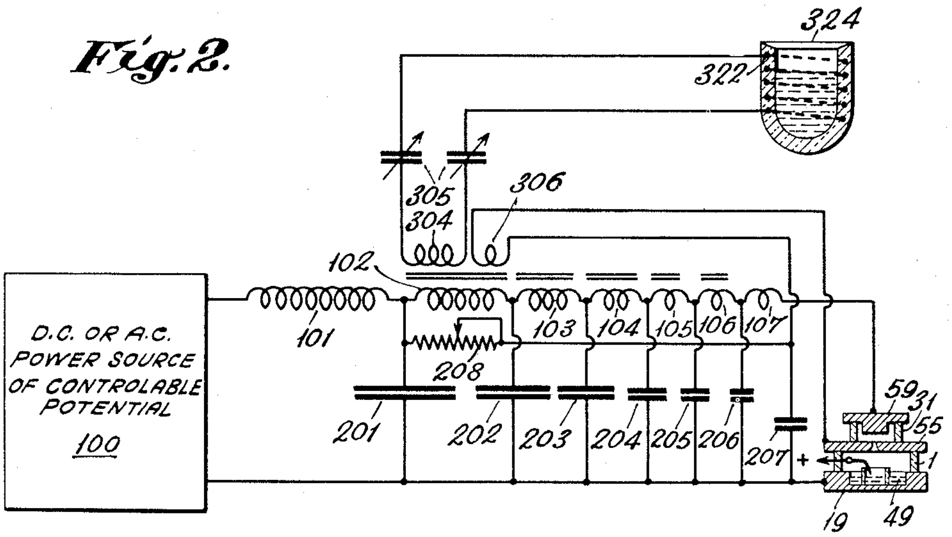

The present invention will be more fully understood by reference to the following detailed description which is accompanied by a drawing in which, Figure 1 illustrates one form of the invention, while, Figure 2 is a circuit diagram illustrating a modification of the present invention.

Referring now to Figure 1, there is shown a mercury arc discharge tube having a mercury pool 49 within a hollowed out portion in base plate 19. A perforated barrier anode 55 is provided, spaced from and insulatingly supported from the base plate 19 by a glass body 1. The joints between the body 1 and the metallic plates 55 and 19 are sealed to permit the evacuation of the space within body 1. Direct glass to metal seals may be used provided the glass and metal have matched temperature coefficients of expansion, as is well known in the art. Alternatively the body 1 may be arranged to be soldered to the metallic plates by any of the recently developed processes by means of which ceramic or glass articles may be soldered to metal bodies.

The barrier anode plate 55 is provided with a central aperture 57. Over barrier anode 55 and spaced therefrom is a final anode 59. Anode 59 may be insulatingly supported from the barrier anode plate 55 by means of insulating ring 31, and the joints between insulating ring 31 and plates 55 and 59 may be sealed in the same way as described above with reference to the insulating ring 1.

In operation a standing arc is set up between cathode pool 49 and barrier anode 55 and a second arc is drawn from cathode pool 49 through aperture 57 to anode 59.

Means are provided within the tube for starting the arc discharge, said means comprising a starter point 53 which may be made of a rather high resistance carborundum compound as commonly used in modern "ignition" rectifiers. This starter point passes up over the top edge of the arc confining ring 51 and it is mounted with its tip either touching or within say about $\frac{1}{16}$ of an inch or less from the mercury surface of ring 51. By applying a high voltage, preferably momentarily, from the starter point to the mercury surface, it is possible to start an arc from the mercury surface inside the ring 51 to the first anode 55 without difficulty. Lead 60 from a high voltage source to the arc starter point 53 contains a high variable resistance 61 so that the current drawn by the arc striking from the surface of the mercury to the starter point is maintained within reasonable limits. The high resistivity of the starter point itself prevents arcing to the starting point during operation. That is, the starter point and its circuit is virtually an insulator as far as the main arc potentials and currents are concerned.

A low positive potential is applied to the barrier anode 55 through a circuit including variable resistor 71 and inductance 72. By applying potential to the barrier anode 55 and momentarily energizing the arc starter point 53, it is possible to start an arc between the barrier anode 55 and the mercury pool. This arc continues as long as the system is in operation and constitutes the means for maintaining continuous ionization in the chamber between the barrier anode and the cathode.

By energizing anode 59 through a series circuit including variable resistor 81 and primary 82 of the load transformer 83 a current may be drawn through the hole 57 to the second anode 59. The current may be varied at will by varying the value of resistor 81 and the voltage of the supply source from a value of a few milliamperes to a critical limiting value which may, for example, range from 1 to 50 amperes in a particular case, depending upon the dimensions of the hole 57 and the gas or vapor pressure in the vicinity of the hole. After a certain critical limiting value of current is attained, it is found that the anode current fluctuates or oscillates. The intensity and frequency of the oscillations developed in the anode circuit increase rapidly with increasing voltage. The oscillations are believed to be caused by the arc through the hole 57 producing a pumping effect or motion of ions and molecules of gas or vapor toward cathode 49 through the hole accompanied by some condensation on the walls of hole 57. When the current is made large enough, the pumping and vapor condensation effect exceeds the back diffusion of gas and vapor through hole 57. This results in a relatively high vacuum in the path of the arc on the anode side of the hole 57 and in the hole itself. The high vacuum extinguishes the arc momentarily until the arc path within hole 57 is refilled with gas or vapor, at which time the arc to anode 59 is established again, only to extinguish itself as before.

A more complete description of the manner of operation may be obtained by reference to my above-mentioned patent, but the foregoing description is believed sufficient for the purpose of understanding the operation of the present invention.

Load transformer 83 has a secondary 84 which is connected to load 85 which may, for example, be an induction heating furnace of any known type. Since the transformer with its load circuit will be inductive in character, it has been discovered that the circuit as so far described may in most circumstances develop high peak voltages on the anode of the oscillator due to the inductive effect of primary 82 of the transformer. The high peak voltages developed may be prevented by connecting a condenser 87 between anode 59 and the perforated barrier anode 55 together with the inductance 72 coupled from the barrier anode to the cathode. Thus, when the anode current is substantially interrupted, the current simply is transferred momentarily to condenser 87 and the current passed through the condenser flows easily through the continuous arc path, in a positive direction from the perforated anode to the cathode. Thus, in effect, there is provided a voltage suppressing condenser between the anode and barrier anode and cathode to prevent the high peak voltages at the moments of current interruption in the same manner as a condenser across relay contacts prevents high peak voltages being developed thereacross when the contact is opened. The energy developed in the condenser due to the momentarily continued flow from the power supply is substantially all returned to the load transformer by a more or less constant flow of current through coil 72, which flow must be kept greater than the reverse oscillation current through condenser 87 and transformer 82. That is, the oscillatory current through condenser 87 must not be allowed to reduce the current from perforated anode 55 to the cathode 49 to zero or otherwise the electron emissive spot on cathode 49 will be lost. It should be noted that the inductance 72 serves the purpose of limiting the instantaneous discharge current from the condenser path to the anode and through the hole 57 in the perforated barrier anode 55 at the instant the arc strikes through. Previous attempts to use a condenser for reducing such peak voltages, when inductance 72 was not used, have given difficulty because the condenser discharge through the hole causes an almost instantaneous interruption of current immediately following the establishment of an arc through the hole 57. This tends to interfere with the intended mode of operation of the device, resulting in a loss of efficiency and in some cases caused by an interruption of the whole arc between mercury pools 49 and barrier anode 55 as well as an interruption of the arc through hole 57.

In this type of oscillator circuit, the frequency of oscillation is determined to a large extent by the values of inductances 72 and condenser 87, somewhat modified by the effective impedance of the transformer primary winding 82.

The modified arrangement shown in Figure 2 utilizes a tube of the same general construction as described with reference to Figure 1. However, in this arrangement, a tapered artificial transmission line is placed in the connections between the power source 100 and the main oscillating circuit and the tube. The artificial line includes a series connected arrangement of inductances 103, 104, 105, 106, 107, between the positive terminal of the power source and anode 59 of the oscillator tube. Between each junction of the series of inductances and the negative terminal of the power source, is connected one of the series of shunt condensers 202, 203, 204, 205, 206, and 207. Inductance 101 and shunt condenser 201 are so proportioned as to act as a decoupling circuit, preventing oscillations generated by the tube from appearing to a substantial degree in power source 100. It will be noted that the artificial transmission line has an inductance and capactiy per section which decreases progressively from the power source toward the tube. If sufficient sections are used, the network may be considered as an artificial line of constant characteristic impedances, since $\sqrt{L/C}$ per unit length remains constant but of increasing phase velocity as the tube is approached, since the LC product per unit length decreases progressively as the tube is approached. The network constituting the artificial transmission line should preferably be so designed that the sections next to the tube have such low values of inductance and capacity that the minimum capacity in the last effective section is provided by the tube capacity. The greater the number of sections and the smaller the ratios of reactance between sections the better will be the result up to a point where losses in the elements overbalance the possible gain or where the added cost makes further sectioning unprofitable. In most cases, relatively few elements will suffice. Inductance 102 serves as the primary of a load transformer having a secondary 304. The secondary 304 is connected through adjustable series condensers 305 to an induction coil 322 wound around an insulated crucible 324. The crucible may be used to heat or melt ores, precious metals, alloys, or other materials and may, if desired, be placed inside a vacuum chamber to assist in maintaining purity of the contents. Water or other cooling liquid may be circulated through the coil 322 if necessary to cool the coil itself.

Now in this arrangement, when the tube continuously interrupts its current, transient increases or potential appear and reach their maximum in one section after another of the artificial transmission line and by the time the potential wave reaches the main oscillating circuit, including the inductance 102, transients have substantially subsided in circuit sections more closely adjacent to the tube. The result is that instead of reaching a tremendous instantaneous peak across the tube, the potential tends to rise to a reasonable value and hold to this value during the whole transient period. During continuous oscillation the potential waves applied to the main oscillatory circuit have their harmonic components substantially suppressed in the network between the main oscillatory circuit and the tube. Therefore, harmonic frequency energy is very largely prevented from entering the load circuit which is inductively coupled to the main oscillatory circuit. Furthermore, at times when the tube suddenly becomes conducting again, the current is prevented from reaching its limiting value instantaneously but instead tends to reach some definite value less than limiting and then to increase relatively slowly until limiting and current interruption takes place. The over-all result is to permit the tube to operate with a more or less rectangular wave form of potential and current which is the condition required for maximum output and conversion efficiency.

In the arrangement shown in this figure, I have provided a feedback coupling including inductance 306 in inductive relationship with the main load circuit 102 and coupled across the barrier anode circuit. This feedback circuit times the start of current impulses in the tube so the frequency is determined primarily by the constants of the load circuit. The condenser 207 and charging resistance 208 provide means for applying an initial starting potential to the barrier anode 55.

In the arrangement of Figure 2, since the current to the barrier anode 55 and anode 59 are both zero during a substantial part of each cycle it is necessary to provide auxiliary means to keep the cathode spot and arc alive during these periods. This may be done by passing a steady D. C. current from the internal connections of the starter 53 to the mercury pool at all times when the tube is operating.

It should be understood that, while I have shown a feedback coupling from the output circuit through coil 306 for causing periodic reestablishment of the self extinguishing anode current through the hole 57 in barrier anode 55, I may, if desired, use an external source of pulses, or A. C. potential, between the barrier anode and cathode, in place of the feedback, so that the frequency of the oscillations may be controlled by the external source.

While in the foregoing description I have illustrated the main power source as being a direct current source, if desired an alternating current power source may be used.

What is claimed is:

1. A high frequency oscillator circuit including a tube having a gaseous discharge path between electrodes including a cathode, a barrier anode, and an anode, apparatus including a power supply source connected to said anode and cathode for causing the gaseous discharge path to be established and interrupted abruptly, an inductive load circuit coupled to said oscillator, and means for preventing the development of peak potential impulses due to the effect of the sudden change of current in the gaseous discharge path including a series combination having at least one inductor and one capacitor in shunt to said source and to said discharge path to reduce said peak impulses.

2. A high frequency oscillator circuit including a tube having a gaseous discharge path between electrodes including a cathode, a barrier anode, and an anode, apparatus including a power supply source connected to said anode and cathode for causing the gaseous discharge path to be established and interrupted abruptly, an inductive load circuit coupled to said oscillator, and means for preventing the development of high peak potential impulses due to the effect of the sudden changes of current in said gaseous discharge path, including a capacitor connected between said anode and barrier anode and an inductor connected between said barrier anode and cathode, said capacitor absorbing said peak potential impulses and said inductor serving to discharge said capacitance during periods between said peak potential impulses.

3. A high frequency oscillator circuit including a tube having an anode and a cathode connected across a source of power so that a gaseous discharge path is formed, which gaseous discharge path is established and interrupted abruptly, an inductive load circuit coupled to said oscillator, and means for preventing the development of high peak potential impulses due to the effect of the sudden changes of current in said gaseous discharge path, said means including an artificial transmission line circuit comprising series inductors connected between said source of power and said gaseous discharge tube and coupled to said load circuit.

4. A high frequency oscillator circuit including a tube having an anode and a cathode connected to a source of potential, with the anode and cathode in a gaseous discharge path characterized in that the gaseous discharge path is established and interrupted abruptly, an inductive load circuit coupled to said oscillator, and means for preventing the development of high peak potential impulses due to the effect of the sudden changes of current in said gaseous discharge path, said means including an artificial transmission line including series inductance and shunt capacitors in the coupling between said load circuit and said oscillator circuit, said inductors also being in the connection between said source of potential and the electrodes of said tube, said artificial transmission line being so dimensioned as to provide a decreased effective impedance to sudden changes in current in series with said gaseous discharge.

5. A high frequency oscillator circuit including a gaseous discharge tube having a cathode, a barrier anode, and an anode, a source of current, a load impedance in a supply circuit between said anode and said source of current, a condenser connected between said anode and said barrier anode for storing peak energy impulses due to the sudden cessation of current between said anode and cathode, and an inductance connected between said barrier anode and said cathode for passing a continuous current to balance the pulses of charge into said condenser.

6. A high frequency oscillator circuit including a gaseous discharge tube having a cathode, a barrier anode, and an anode, a load circuit coupled in a circuit between said anode and a source of current, a series of inductances connected between said load circuit and said anode and a series of capacitances, one connected from the junction between each of said series of inductances to said cathode, said inductances and capacitances forming an artificial transmission line so dimensioned that said load appears to said tube substantially as a resistance.

7. A high frequency oscillator circuit including a gaseous discharge tube having a cathode, a barrier anode, and an anode, a load circuit coupled in a circuit between said anode and a source of current, a series of inductances connected between said load circuit and said anode and a series of capacitances, one connected from the junction between each of said series of inductances to said cathode, said inductances and capacitances forming an artificial transmission line, the values of said inductances and capacitances gradually decreasing from said load toward said tube.

8. A high frequency oscillator circuit including a gaseous discharge tube having a cathode, a barrier anode, and an anode, a load circuit coupled in a circuit between said anode and a source of current, a series of inductances connected between said load circuit and said anode and a series of capacitances, one connected from the junction between each of said series of inductances to said cathode, said inductances and capacitances forming an artificial transmission line, the ratio of inductances to capacitances per section, of the artificial transmission line formed by said inductances and capacitances being constant.

9. A high frequency oscillator circuit including a gaseous discharge tube having a cathode, a barrier anode, and an anode, a load circuit coupled in a circuit between said anode and a source of current, a series of inductances connected between said load circuit and said anode and a series of capacitances, one connected from the junction between each of said series of inductances to said cathode, said inductances and capacitances forming an artificial transmission line, the characteristic impedance of the artificial transmission line formed by said inductances and capacitances being constant, the phase velocity increasing along said line progressing from said load to said tube.

10. A high frequency oscillator circuit including a gaseous discharge tube having a cathode, a barrier anode, and an anode, a load circuit coupled in a circuit between said anode and a source of current, a series of inductances connected between said load circuit and said anode and a series of capacitances, one connected from the junction between each of said series of inductances to said cathode, said inductances and capacitances forming an artificial transmission line so dimensioned that said load appears to said tube substantially as a resistance, and a feedback coil connected from said barrier anode to said cathode and coupled to said load circuit whereby the frequency of oscillation of said circuit is determined by the constants of said load circuit.

11. A high frequency oscillator circuit including a gaseous discharge tube having a cathode, a starter and arc holding electrode, a barrier anode, and an anode, a load circuit coupled in a circuit between said anode and a source of current, a series of inductances connected between said load circuit and said anode and a series of capacitances, one connected from the junction between each of said series of inductances to said cathode, said inductances and capacitances forming an artificial transmission line, the reactances of said inductances and capacitances gradually decreasing from said load toward said tube, and a feedback coil connected between said barrier anode and said cathode and coupled to said load circuit whereby the frequency of oscillation of said circuit is determined primarily by the constants of said load circuit.

12. A high frequency oscillator circuit including a gaseous discharge tube having a cathode, a starter and arc holding electrode, a barrier anode, and an anode, a load circuit coupled in a circuit between said anode and a source of current, a series of inductances connected between said load circuit and said anode and a series of capacitances, one connected from the junction between each of said series of inductances to said cathode, said inductances and capacitances forming an artificial transmission line, the ratio of inductances to capacitances per unit length, of the artificial transmission line formed by said inductances and capacitances being constant, and a feedback coil connected from said barrier anode to said cathode and coupled to said load circuit whereby the frequency of oscillation of said circuit is determined by primarily the constants of said load circuit.

13. A high frequency oscillator circuit including a tube having a gaseous discharge path characterized by the property of interrupting itself suddenly when the current through it exceeds a critical value, an inductive load circuit coupled to said oscillator, and a network interposed between said load circuit and said oscillator for preventing the development of high peak potential impulses due to the effect of the sudden interruption of current through said gaseous discharge path.

14. A high frequency oscillator circuit including an arc discharge tube having an anode, a barrier anode and a cathode, a source of operating potential connected to said arc discharge tube, an inductive load circuit coupled to said oscillator circuit, and means arranged in circuit between said load circuit and said oscillator circuit for preventing the development of high peak potential impulses due to the effect of the sudden changes of current in the gaseous discharge path of said arc discharge tube, said means including at least an inductor and a capacitor, said inductor also being in the connection between said source of potential and one of the electrodes of said arc discharge tube.

15. A high frequency arc discharge oscillator circuit including a tube having an anode and a cathode connected to a source of potential, with the anode and cathode in a gaseous discharge path characterized in that the gaseous discharge path is established and interrupted abruptly, an inductive load circuit coupled to said oscillator circuit, and a reactance network interposed in the coupling between said load circuit and said oscillator circuit for preventing the development of high peak potential impulses due to the effect of the sudden changes of current in said gaseous discharge path, said network including at least two reactances of opposite sign, with respect to each other.

16. A high frequency arc discharge oscillator circuit including a tube having an anode, a barrier anode, an arc holding electrode, a starter and a cathode, a source of potential connected to said tube, the anode and cathode being in a gaseous discharge path characterized in that the gaseous discharge path is established and interrupted abruptly, an inductive load circuit interposed between said anode and said source of potential, a capacitor connected directly across said anode and said barrier anode and an inductor interposed between said barrier anode and said source of potential for preventing the development of high peak potential impulses due to the effect of the sudden changes of current in said gaseous discharge path.

CLARENCE W. HANSELL.

REFERENCES CITED

The following references are of record in the file of this patent:

UNITED STATES PATENTS

| Number | Name | Date |
|---|---|---|
| 1,898,932 | Bedford | Feb. 21, 1933 |
| 2,051,609 | Langmuir | Aug. 18, 1936 |
| 2,084,725 | Dallenbach | June 22, 1937 |
| 2,184,740 | Hansell | Dec. 26, 1939 |
| 2,394,389 | Lord | Feb. 5, 1946 |

OTHER REFERENCES

Journal Scientific Instruments, October 1936, vol. 13, No. 10, by C. V. Rajam.